United States Patent [19]

Yurdin et al.

[11] 4,205,895
[45] Jun. 3, 1980

[54] COLLAPSIBLE LENS SHADE

[75] Inventors: Carl Yurdin, Port Washington; Carmel S. Monti, Deer Park, both of N.Y.

[73] Assignee: Ambico Inc., Lynbrook, N.Y.

[21] Appl. No.: 892,204

[22] Filed: Mar. 31, 1978

[51] Int. Cl.² ............................................. G02B 11/04
[52] U.S. Cl. ........................................ 350/60; 354/188
[58] Field of Search .................... 350/60, 58; 354/187, 354/174, 296, 122, 295, 125, 122, 124, 191, 188; 352/91; 95/144; 22/20, 22; D16/5

[56] References Cited

U.S. PATENT DOCUMENTS

| | | | |
|---|---|---|---|
| 342,211 | 5/1886 | Lewis et al. | 354/187 |
| 445,561 | 2/1891 | Knox | 354/122 |
| 562,977 | 6/1896 | Rosch | 354/296 |
| 704,334 | 7/1902 | Hutchings | 354/187 |
| 762,164 | 6/1904 | Gundermann | 354/187 |
| 1,304,093 | 5/1919 | Potts | 354/187 |
| 1,368,761 | 2/1921 | Schlegel | 354/122 |
| 1,450,522 | 4/1923 | Stinchfield | 350/60 |
| 1,468,091 | 9/1923 | Thalhammer | 334/296 |
| 1,578,842 | 3/1926 | Mitchell | 350/60 |
| 1,833,459 | 11/1931 | Green | 354/187 |
| 1,991,814 | 2/1935 | Mitchell | 354/296 |
| 2,014,322 | 9/1935 | Foulis et al. | 350/60 |
| 2,498,581 | 2/1950 | Rogers | 350/60 |
| 3,087,400 | 4/1963 | Brandt | 354/191 |
| 3,745,903 | 7/1973 | Studly | 354/181 |
| 3,940,775 | 2/1976 | Bodnar | 350/60 |

Primary Examiner—John K. Corbin
Assistant Examiner—B. Wm. de los Reyes
Attorney, Agent, or Firm—Frishauf, Holtz, Goodman & Woodward

[57] ABSTRACT

A collapsible lens shade comprises a foldable bellows connected between front and second plate-like members. A track member is pivotally connected to one of the front and rear plate-like members, preferably the front member, and locking means is provided for locking the track in a position extending from the member to which it is pivotally connected. Slide means is coupled to the other of the front and rear members to permit same to slide along the length of the track member when the track member is in its extended, locked position, and second locking means is provided for locking the slide means at selected positions along the length of the track means. Replaceable adaptors are preferably provided to enable the lens shade to be used with lenses of various barrel diameters. Also, means for inserting filters or other special effect plates is provided, as well as a flash or accessory shoe.

32 Claims, 10 Drawing Figures

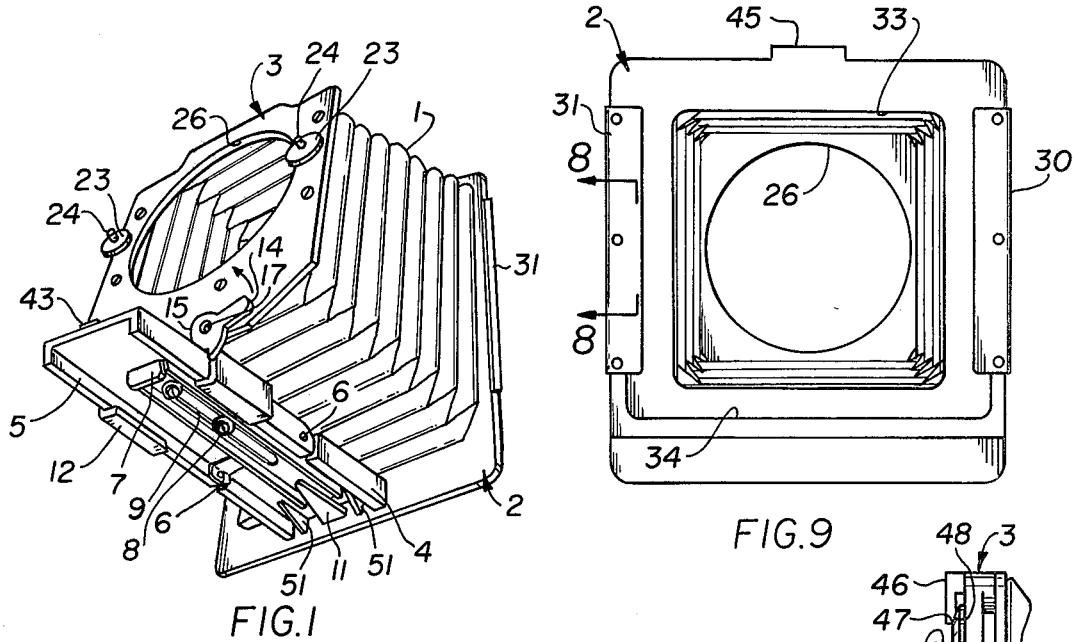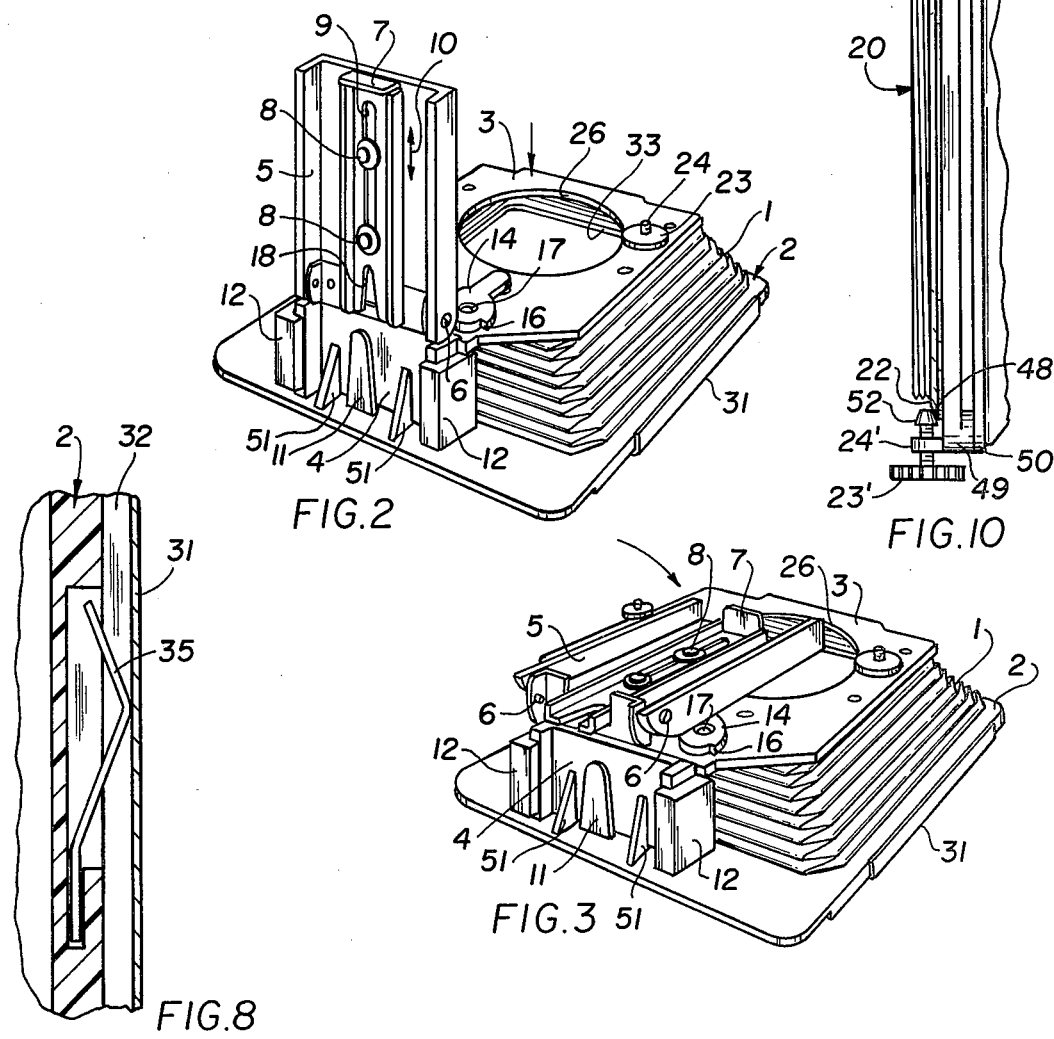

COLLAPSIBLE LENS SHADE

BACKGROUND OF THE INVENTION

This invention relates to foldable or collapsible lens shades, and more particularly to a collapsible bellows-type lens shade which has a high degree of versatility.

Various types of lens shades are widely known. Some of the known lens shades are fixed in length. Others are adjustable in length, such as by means of a bellows. However, the known adjustable length lens shades known to Applicants do not collapse to a relatively small size and are therefore bulky to use and to transport about. Also, the known lens shades are of limited versatility.

An object of the present invention is to provide a highly versatile collapsible lens shade which is adjustable for a plurality of different focal length lenses, and which collapses and folds to an extremely compact shape for easy storage and transportability.

A further object of the present invention is to provide such a lens shade which further has means for accepting filters or special effect plates, a flash or accessory shoe, and means for securely locking the lens shade at any of its selected length positions.

Various other objects and features of the invention will become more apparent from the following description of the invention.

SUMMARY OF THE INVENTION

In accordance with the present invention, a collapsible lens shade comprises front and rear members, and a foldable bellows connected between the front and rear members. An elongated track member is pivotally connected to one of the front and rear members, preferably the front member and a first locking means is provided for locking the track member in a position extending from said one of said front and rear members. Slide means is coupled to the other of said front and rear members, preferably to the rear member, and is slidable along the length of said track member when said track member is in its extended, locked position to vary the position of said other of said front and rear members along said track member. A second locking means is further provided for locking the slide means at selected positions along the length of the track member to thereby lock the other of the front and rear members relative to the track member.

In a preferred embodiment, the second locking means comprises a frictional locking means having an eccentric camming surface which bears against the track member, and the first locking means comprises a slide member which is slidable relative to the track member for engaging an engagement member which is attached to the one of the front and rear members to which the track member is pivotally connected.

Still further, in a preferred embodiment, means is provided for accepting filters and/or special effect plates in front of the lens to which the lens shade is connected, and removable adaptor elements are provided to permit the lens shade to be connected to lenses of various barrel diameters.

BRIEF DESCRIPTION OF THE DRAWINGS

FIG. 1 is a perspective view of a collapsible lens shade according to the present invention in its extended condition;

FIG. 2 is a perspective view of the lens shade of FIG. 1 with the bellows in a collapsed condition, but the track extended;

FIG. 3 is a perspective view of the lens shade of FIGS. 1 and 2 with both the bellows and track collapsed;

FIG. 8 is a partial sectional view of the engagement mechanism for retaining filters, or the like, in the front portion of the lens shade;

FIG. 9 is a front view of the front member of the lens shade; and

FIG. 10 illustrates a modification to the adapter mount.

DETAILED DESCRIPTION

Figure 4:
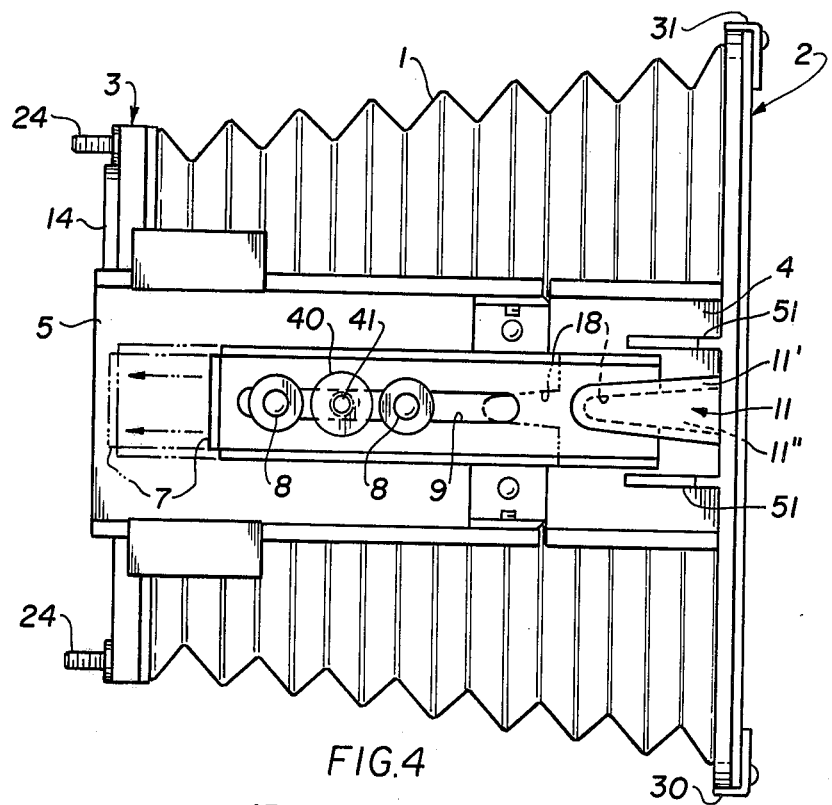
FIG. 4 is a bottom view of the lens shade, in its extended condition, illustrating the operation of the lock for the foldable track.

Referring to FIGS. 1-3, the collapsible lens shade of the present invention comprises a foldable bellows 1 secured at the front or widest portion thereof to a front member 2 and secured at the rear portion thereof to a rear member 3. A first track member 4 extends from the bottom portion of front member 2 and a second track member 5 is pivotally connected to the first track member 4 by means of, for example, pins 6. The second track member 5 is foldable relative to the first track member 4. The foldable track member 5 further has a slide 7 slidably mounted thereon by means of projection member 8 which have heads which exceed the width of the slot 9 in the foldable member 5. The projecting members 8 may be screws, or the like. The slide member 7 is slidable relative to the foldable track member 5 in the direction of the arrow 10 shown in FIG. 2. The first or stationary track member 4 has an engagement member 11, the head of which (which is seen in FIGS. 1-3) forms an extending flange 11' around a base portion 11", the base portion 11" of engaging member 11 being shown in dashed lines in FIG. 4. In FIG. 1, the slide member 7 is engaged under the flanged portion 11' of the engaging member 11, thereby locking the slide member 5 at its operative or open condition whereby it is in alignment with the stationary track member 4. As shown in FIG. 4, a nut member 40 threadably engaged to a post 41 (i.e., screw) extending from the bottom of the track member 5 and extending through slot 9 in slide member 7, may optionally be provided to serve as a lock for the slide member 7. When nut 40 is tightened on the threaded post 41 to bear against the slide member 7, thereby locking it in that position.

Figure 5:
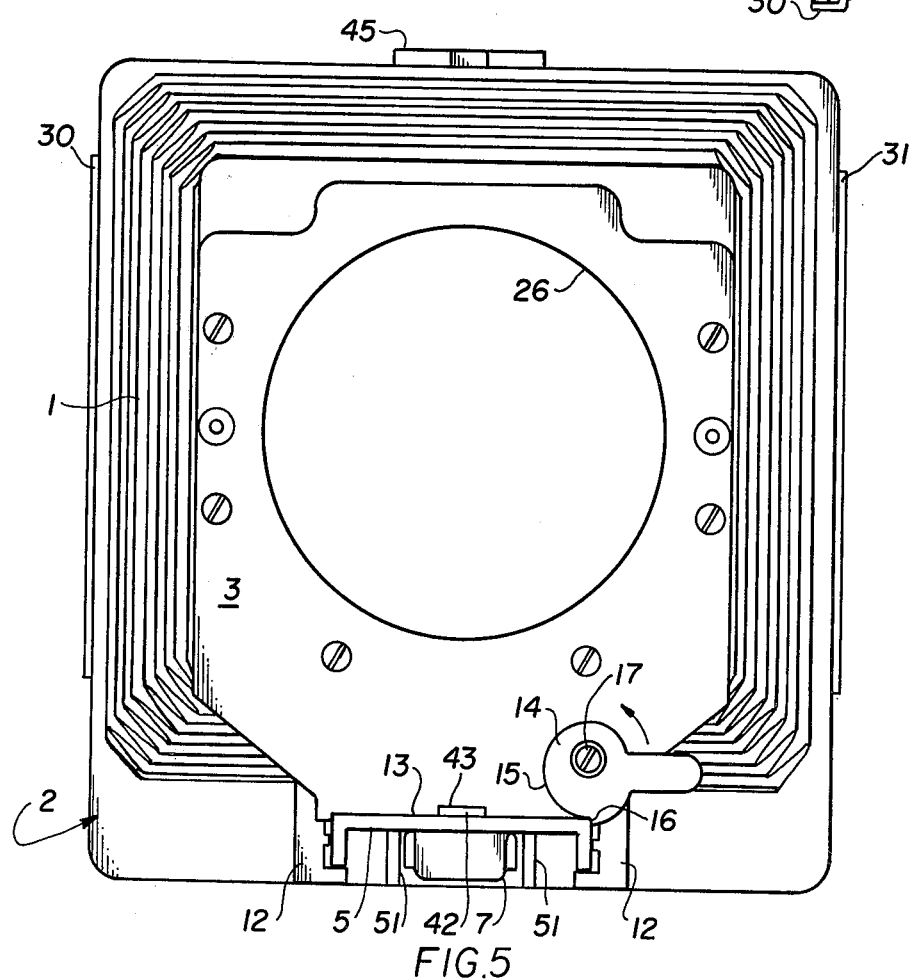
FIG. 5 is a rear view of the lens shade.

The rear plate-like member 3 of the lens shade has a slide device 12 either connected thereto or made integrally therewith, which slide device 12 slides along track members 4 and 5. The device 12 comprises two generally L-shaped portions and slides along the sides and a portion of the bottom of track members 4 and 5. The lower surface 13 of rear plate-like member 3 slidingly engages the upper surface of track members 4 and 5, as shown in more detail in FIG. 5. The track members 4 and 5 optionally have an elongated guide 42 thereon which engages a cut-out 43 in the rear member 3, as best seen in FIG. 5.

A locking device 14 is pivotally mounted to the rear plate-like member 3, the locking device 14 having an eccentric camming surface 15 (more clearly seen in FIG. 5) and a step-like stop surface 16. The locking device 14 rotates about a pivot member 17, which may be a screw, pin, or other projection. When the bellows are extended, for example to the position shown in FIG. 1 or any intermediate or fully extended position, the locking device may be turned clockwise about its pivot point 17 whereby the eccentric camming surface 15 bears against the upper surface of the track member 5, thereby frictionally locking the rear plate-like member 3 relative to the track member 5. The step-like stop portion 16 prevents excess turning of the lock member 14, thereby reducing the possibility of damage. The lock member 14 may be mounted to the slide device 12 instead of directly to the rear member 3.

In order to collapse the lens shade of the present invention, the lock member 14 is first released by turning same counterclockwise about pivot 17, the rear plate-like member 3 is then pushed toward the front member 2 in order to cause the bellows 1 to collapse and the slide member 12 to slide along track members 5 and 4 until it reaches the position shown in FIG. 2. The slide member 7 is then pulled to the left (referring to FIG. 1) so as to disengage the front notched portion 18 thereof from the engaging member 11 which extends rearwardly on front member 2. The position whereby the slide member 7 is released from the engaging member 11 is shown in FIG. 2. Then, the second track member 5 is pivoted about its pivot pins 6 to the position shown in FIG. 3, thereby fully collapsing the lens shade.

Figure 6:
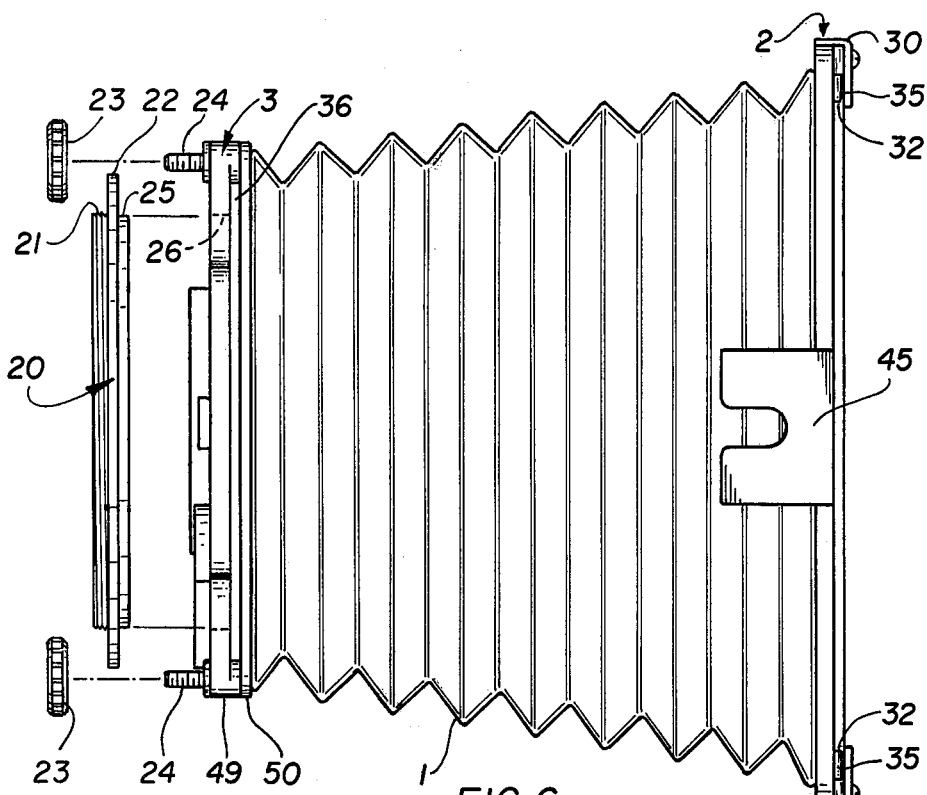
FIG. 6 is a top view of the lens shade showing how an adaptor is installed.

The lens shade is secured to a camera, or the like, by means of an adaptor element 20 shown in the top view of FIG. 6. The adaptor element has screw threads 21 on the outer periphery thereof which are adapted to be screwed to a lens barrel, or the like. The adaptor further has a flange portion 22 extending peripherally therefrom which is secured under threaded nuts 23 which are threaded onto screw posts 24 which extend rearwardly from the rear plate-like member 3 of the lens shade. The front-most portion 25 of the adaptor 20 is a locating portion and is dimensioned to snugly fit within the opening 26 of the rear plate-like member 3. After the nut members 23 are screwed tightly over the flange 22 of the adaptor 20, the resulting structure looks as seen in the side view of FIG. 7.

Figure 7:
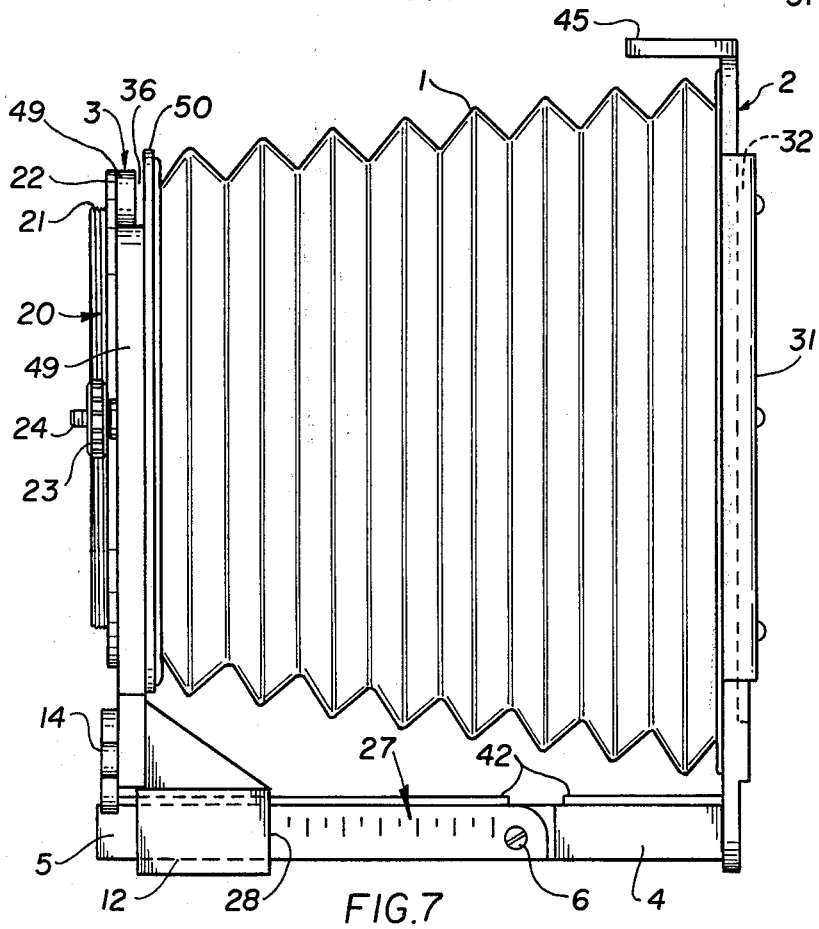
FIG. 7 is a side view of the lens shade, in its extended condition.

As seen in FIGS. 5–7, the front member 2 has a flash or accessory shoe 45 on the top portion thereof. This increases the versatility of the lens shade of the present invention. The flash or accessory shoe 45 is preferably integral with the front plate-like member 2 for increased strength.

As shown in FIG. 7, the second track member 5 has a scale 27 on the side surface thereof which indicates from 1–10 to correspond with different focal length via a conversion label. Focal length scales on the side of the side track 5 are important since this will enable the user to determine critical positions of the lens shade for different focal length lenses in order to prevent vignetting. In operation, for example the right-most surface 28 of the slide member 12 could serve as an indicator along the focal length scale 27, whereby the degree of extension of the bellows can be set in accordance with the focal length of the lens being used in order to prevent vignetting.

The front plate-like member 2 has angled members 30, 31 secured thereto to define a channel 32 for receiving special effect plates or sheets, filters, or the like in front of the lens shade so as to cover the front opening 33 (FIG. 9) of the lens shade. In use, a filter or special effect sheet is inserted into the channel 32 over the front opening 33 of the front member 2. The front member 2 is of a stepped configuration, as seen better in FIGS. 7 and 9, the lower step portion 34 serving as a stop for the inserted filter or special effects plate.

As seen in FIG. 8, a spring-type locking arrangement is located in the channel 32 which comprises a leaf spring 35 biased toward the member 31 to grip a filter or special effects plate inserted between the spring 35 and member 31. The tension spring lock 35 is effective to hold plates or filters either fully or partly in the slot 35 so as to achieve special effects, if desired. A similar spring member 35 is provided on the other side of the front member 2, for example in conjunction with the L-shaped member 30.

A filter slot 36 is provided in the rear member 3 for insertion of other filters or special effect plates in the rear portion of the lens shade. Thus, two different filters and/or special effects plates can be used in the lens shade of the present invention. A spring tension locking device for filters or special effects plates can be provided in the rear slot 36, similar to the locking device shown in FIG. 8.

FIG. 10 illustrates a modification to the adaptor 20 and the rear plate-like member 3 whereby the adaptor 20 is removably secured to the rear plate-like member 3 in a different manner from that shown in FIGS. 6 and 7. Referring specifically to FIG. 10, the adaptor 20 is first mounted under a generally L-shaped mounting member 46 which extends from the plate-like rear member 3. The leading edge of the mounting member 46 is bevelled at 47 so as to facilitate inserting the flange 22 of the adaptor under the mounting member 46. Similarly, the rearward-most surface of the peripheral portion of flange 22 of the adaptor 20 has a bevel 48 thereon for facilitating placing the adaptor 20 under the mounting member 46. After the adaptor 20 is located under member 46, the adaptor member is locked in place by means of knob 23 which threadably engages post 24. By simply moving in an inward direction over the flange of the adapter and holding the adapter in place, the knob and screw is passed through a hole in the plastic raised on piece 3 and has a nylon tip on the end of the screw so as to not score the adapter.

Most of the elements used in the collapsible lens shade of the present invention can be fabricated by molding techniques from strong plastics, such as polycarbonates. For example, the rear plate-like member 3 may be fabricated from one molding, or as shown in FIGS. 6, 7 and 10, from 1 moldings 49 and 1 stamping 50. The screws 24 may secure the two pieces 49 and 50 together and if desired, to the bellows 1. When the arrangement of FIG. 10 is used, the mounting member 46 may be fabricated integrally in a single molding with element 49. The adaptor 20 is preferably of a metallic material, but also could be made from plastic material.

The track members 4 and 5 are also preferably of plastic, as is the slide members 12. Track member 4 is further preferably molded integrally with the front plate-like member 2 of plastic material, such as a polycarbonate. The engagement member 11 is likewise preferably integrally formed with the front plate-like member 2. In such a construction, reinforcing members are also integrally molded into the front plate-like member to improve structural strength. Preferably, the flash or accessory shoe member 45 is likewise integrally formed with the front plate-like member 2. The slide locking device 14 may be formed of plastic material, such as polycarbonate, or of metal.

While the invention has been described with respect to the track members 4 and 5 being mounted to the front plate-like member 2, it should be clear that these members could be similarly mounted to a rear plate-like member 3 and that the front member could slide along the track in a manner similar to that in which rear plate-like member 3 slides along the track in the illustrated embodiment. In such a modified construction, the rear member 3 would be enlarged relative to that shown in the present drawings, and the front member 2 would have a reduced area or a cut-out portion to permit same to slide along a track similar to tracks 4 and 5 to collapse the bellows and to slide rearwardly toward the rear member 3.

It should be clear that various other modifications and alterations could be made to the present invention concept, such as modification of size and shape of various elements, types of materials used, etc., within the scope and spirit of the present invention as set forth in the appended claims.

We claim:

1. A collapsible, adjustable lens shade external to a lens of a camera and for attachment to the front of said lens, comprising:
    a front member (2);
    a rear member (3);
    adapter means (20) coupled to said rear member (3) for securing said rear member (3) to the front of a lens;
    a foldable shade means (1) connected between said front member (2) and said rear member (3);
    an elongated track means (4, 5) including a first track member (4) connected to and extending from said front member (2); and an elongated second track member (5) pivotally connected at one end to said first track member (14);
    first locking means (7, 11) for locking said second track member (5) in a position extending from and aligned with said first track member (4);
    slide means (12) coupled to said rear member (3) and being slidingly engaged with said track means so as to be slideable along the length of said track means when said second track member is in its extended, aligned, locked position, to vary the position of said rear member (3) along the length of said track means, thereby varying the effective length of said foldable shade means; and
    second locking means for locking said slide means (12) at selected positions along the length of said track means to thereby lock said rear member (3) relative to said track means.

2. The collapsible lens shade of claim 1, wherein said second lock means comprises a friction lock.

3. The collapsible lens shade of claim 2, wherein said friction lock comprises a member having an eccentric camming surface adapted to frictionally bear against said second track member (5).

4. The collapsible lens shade of claim 1, wherein said first track member (4) is fixedly connected to said front member (2).

5. The collapsible lens shade of claim 4, wherein said first track member (4) has a length sufficient to accommodate the foldable shade means (1) in its folded state within the length thereof.

6. The collapsible lens shade of claim 5, wherein said slide means (12) is accommodated completely on said first track member (4) when said foldable shade means is in its folded state.

7. The collapsible lens shade of claim 1, wherein said first track member (4) is fixedly connected to said front member, and said second track member (5) is pivotally connected to the end of said first track member which is most remote from said front member.

8. The collapsible lens shade of claim 7, wherein said first track member (4) has a length sufficient to accommodate said slide means and said foldable shade means in its folded condition.

9. The collapsible lens shade of claim 7, wherein said first locking means comprises slidable locking means (7, 11) coupled to said track means (4, 5) for locking said second track member (5) in a position whereby it is extended from said first track member (4) and in alignment with said first track member and whereby said first and second track members extend substantially perpendicularly to said front member.

10. The collapsible lens shade of claim 9, wherein said slidable locking means comprises a slidable lock member (7) slidably mounted on said second track member (5), and a fixed engagement member mounted to at least one of said first track member (4) and said front member for engaging said slidable lock member (7).

11. The collapsible lens shade of claim 10, wherein said slidable lock member (7) has a notch herein and said fixed engagement member (11) has means for engaging said notch.

12. The collapsible lens shade of claim 10, wherein said first track member (4) is fixedly connected to said front member (2) and extends substantially perpendicular therefrom, and said second track member is pivotally connected to the free end of said first track member.

13. The collapsible lens shade of claim 10, comprising means (40, 41) for locking said slideable lock member (7) relative to said second track member (5).

14. The collapsible lens shade of claim 13, wherein said slideable lock member (7) comprises an elongated slot (9) therein, and said means for locking said slideable lock member (7) relative to said second track member (5) comprises a threaded member (41) extending from said second track member and through said elongated slot (9), and a knob member (40) threadably engaging said threaded member (41) for locking said slideable lock member (7) against said second track member (5).

15. The collapsible lens shade of claim 1, wherein said slide means comprises members engaging the sides of said elongated track means for sliding therealong.

16. The collapsible lens shade of claim 15, wherein said second locking means comprises a friction lock member (14) having an eccentric camming surface adapted to frictionally bear against said track means.

17. The collapsible lens shade of claim 16, wherein said friction lock member (14) is pivotally mounted to said rear member, said eccentric camming surface being adapted to bear upon a surface of said track means when said friction lock member (14) is rotated, thereby frictionally retaining said slide means and said rear member in a given relative position along the length of said track means.

18. The collapsible lens shade of claim 16, wherein said eccentric cam (14) further comprises stop means (16) for limiting the movement thereof relative to said track means.

19. The collapsible lens shade of claim 1, wherein said rear member (3) comprises a removable adaptor (20), said adaptor having threads for threadably engaging the front of a lens of a camera.

20. The collapsible lens shade of claim 19, wherein said adaptor has a flange (22) extending therefrom, and said rear member (3) comprises means (23,24) for engaging said flange.

21. The collapsible lens shade of claim 19, wherein said adaptor has a front locating portion (25), and said rear member (3) has an opening (26) for snugly receiving said locating portion (25) therein.

22. The collapsible lens shade of claim 1, wherein at least one of said front and rear member comprises channel means for receiving a filter, special effects plate, or the like therein, such that said filter or special effects plate extends substantially perpendicular to the lengthwise direction of said foldable shade means.

23. The collapsible lens shade of claim 22, wherein said at least one channel forming means comprises locking means for locking said filter, special effects plate, or the like in said channel, at least partially or fully within said channel.

24. The collapsible lens shade of claim 23, wherein said filter locking means comprises a spring adapted to bear against a filter, special effects plate, or the like.

25. The collapsible lens shade of claim 23, wherein said front member comprises said at least one channel and locking means.

26. The collapsible lens shade of claim 25, wherein said filter locking means comprises a leaf spring adapted to bear against a filter, special effects plate, or the like.

27. The collapsible lens shade of claim 1, further comprising accessory shoe means (45) on at least one of said front and rear members.

28. The collapsible lens shade of claim 27, wherein said accessory shoe means is on said front member.

29. The collapsible lens shade of claim 1, wherein said track means comprises a scale thereon for setting the length of said foldable shade means at a predetermined value.

30. The collapsible lens shade of claim 29, wherein said scale (27) on said track means is a numbered scale, whereby the length of said bellows can be set in accordance with the focal length of the lens with which said lens shade is used. In conjuction with a conversion scale.

31. The collapsible lens shade of claim 30, wherein said slide means (12) has means (28) cooperating with said scale (27) to serve as an indicator along said scale (27).

32. The collapsible lens shade of any one of claims 1, 5, 6, 8, 22 or 29, wherein said foldable shade means comprises a foldable bellows.

* * * * *

UNITED STATES PATENT AND TRADEMARK OFFICE
CERTIFICATE OF CORRECTION

PATENT NO. : 4,205,895

DATED : June 3, 1980

INVENTOR(S) : Carl YURDIN et al

It is certified that error appears in the above-identified patent and that said Letters Patent are hereby corrected as shown below:

Column 8 (claim 26), line 5, after "comprises a" delete "leaf";

Column 8 (claim 30), line 18, change "bellows" to --foldable shade means--.

Signed and Sealed this

Eighteenth Day of November 1980

[SEAL]

Attest:

SIDNEY A. DIAMOND

Attesting Officer

Commissioner of Patents and Trademarks